(12) United States Patent
Walters et al.

(10) Patent No.: US 8,931,438 B2
(45) Date of Patent: Jan. 13, 2015

(54) CONDENSING GAS APPLIANCE AND CONDENSATE TRAP THEREFOR

(75) Inventors: Bertram L. Walters, Duxbury, MA (US); Richard A. Williamson, Rochester, NH (US)

(73) Assignee: Laars Heating Systems Company, Rochester, NH (US)

( * ) Notice: Subject to any disclaimer, the term of this patent is extended or adjusted under 35 U.S.C. 154(b) by 473 days.

(21) Appl. No.: 13/428,417

(22) Filed: Mar. 23, 2012

(65) Prior Publication Data

US 2012/0240869 A1    Sep. 27, 2012

Related U.S. Application Data

(60) Provisional application No. 61/467,722, filed on Mar. 25, 2011.

(51) Int. Cl.
*F24H 8/00* (2006.01)
*F24H 1/43* (2006.01)
*F24H 9/20* (2006.01)

(52) U.S. Cl.
CPC .. *F24H 1/43* (2013.01); *F24H 8/00* (2013.01); *F24H 8/006* (2013.01); *F24H 9/205* (2013.01); *Y02B 30/102* (2013.01); *Y02B 30/106* (2013.01)
USPC ...................................... 122/18.1

(58) Field of Classification Search
CPC .................................................. F24H 8/0006

USPC ................... 122/18.1, 31.1; 126/99 R, 110 R
See application file for complete search history.

(56) References Cited

U.S. PATENT DOCUMENTS

| | | | |
|---|---|---|---|
| 4,651,714 A * | 3/1987 | Granberg | 122/18.3 |
| 4,856,550 A * | 8/1989 | Smelcer | 137/192 |
| 5,115,798 A * | 5/1992 | Moore et al. | 122/14.1 |
| 7,905,202 B2 * | 3/2011 | Young | 122/14.2 |
| 8,807,093 B2 * | 8/2014 | Steinhafel | 122/18.1 |
| 2006/0196450 A1* | 9/2006 | Le Mer et al. | 122/18.1 |
| 2010/0170452 A1* | 7/2010 | Ford et al. | 122/14.21 |
| 2010/0221675 A1 | 9/2010 | Rowe | |
| 2012/0291719 A1* | 11/2012 | Steinhafel | 122/18.3 |
| 2013/0118608 A1* | 5/2013 | Holiday et al. | 137/409 |

* cited by examiner

*Primary Examiner* — Gregory A Wilson
(74) *Attorney, Agent, or Firm* — RatnerPrestia

(57) ABSTRACT

A condensing fuel-fired appliance has a condensate trap that includes a trap body; a float; a flue gas inlet port for the introduction of flue gas into the interior region of the trap body; a condensate outlet port for the discharge of condensate from the interior region; and a flue gas outlet port for the discharge of flue gas from the interior region of the trap body. The float is configured to move in response to condensate collected in the interior region of the trap body to a position to substantially block the discharge of flue gas from the interior region through the flue gas outlet port. The float is also configured to move to a position to substantially block the discharge of flue gas from the interior region through the condensate outlet port when there is little or no condensate in the interior region of the trap body.

20 Claims, 5 Drawing Sheets

CONDENSING GAS APPLIANCE AND CONDENSATE TRAP THEREFOR

CROSS-REFERENCE TO RELATED APPLICATION

This patent application claims priority to U.S. Provisional Patent Application No. 61/467,722, filed Mar. 25, 2011, which is incorporated by reference herein.

BACKGROUND OF THE INVENTION

Commercial and residential water heaters, boilers and pool heaters typically heat water by generating tens of thousands, and even hundreds of thousands, of BTUs per hour. For many years, manufacturers of these water heaters have sought to increase the efficiency of the exchange of this heat energy from burned fuel to the water contained in the water heater. Accordingly, maximized heat exchange efficiency has long been sought by commercial and residential appliance manufacturers.

As heat exchange efficiency increases, however, such increased efficiency gives rise to the problems associated with condensation of water vapor from the products of combustion. More specifically, upon burning of a mixture of fuel and air, water is formed as a constituent of the products of combustion. It is recognized that as the temperature of the combustion gases decreases as the result of successful exchange of heat from the combustion gases to water in the appliance, the water vapor within the combustion gases tends to be condensed in greater quantities. In other words, as the temperature of the combustion gases decreases as a direct result of increasingly efficient exchange of heat energy to the water, the amount of condensate forming on the heat exchange surfaces also increases.

In application Ser. No. 12/395,894, filed Mar. 2, 2009 and incorporated herein by reference in its entirety, a system and method is described for configuring a water heater to drain condensate from combustion products. A drain port is positioned at an elevation below a portion of an exhaust passageway to drain condensate from the exhaust passageway. Application Ser. No. 61/444,341, filed Feb. 18, 2011 and also incorporated herein by reference in its entirety, describes water heaters and boilers configured to improve at least one of their performance, efficiency, cost and reliability.

Despite such developments, there continues to be a need for improvements related to the management of the condensation formed by condensing appliances such as water heaters.

SUMMARY OF THE INVENTION

According to one aspect of this invention, a condensing fuel-fired appliance is provided having a fuel burner configured to generate flue gas. The condensing fuel-fired appliance is configured to shut down the fuel burner in response to a sensed condition. The condensing fuel-fired appliance also has a condensate trap positioned to collect condensate from the flue gas. The condensate trap includes a trap body substantially enclosing an interior region; a float positioned for movement within the interior region of the trap body; a flue gas inlet port defined by the trap body for the introduction of flue gas into the interior region of the trap body; a condensate outlet port defined by the trap body for the discharge of condensate from the interior region, the condensate outlet port defining a seat surface for contact with the float; and a flue gas outlet port defined by the trap body for the discharge of flue gas from the interior region of the trap body, the flue gas outlet port defining a seat surface for contact with the float. The float is configured to move in response to condensate collected in the interior region of the trap body to a position contacting the seat surface defined by the flue gas outlet port and to substantially block the discharge of flue gas from the interior region through the flue gas outlet port. The float is also configured to move to a position contacting the seat surface defined by the condensate outlet port and to substantially block the discharge of flue gas from the interior region through the condensate outlet port when there is little or no condensate in the interior region of the trap body.

The condensing fuel-fired appliance can include a condensate drain coupled to the condensate outlet port defined by the trap body of the condensate trap. It can also include a switch configured to shut down the fuel burner in response to a sensed condition, wherein the switch can be a pressure switch configured to shut down the fuel-fired appliance in response to an increase in a pressure of the flue gas when the float blocks the flue gas outlet port.

The condensing fuel-fired appliance can also include a passage through which the flue gas flows, wherein the flue gas inlet port defined by the condensate trap is positioned to receive flue gas from the passage. The passage can be positioned to transfer heat from the flue gas to water contained in heat exchange conduits, and the condensate trap can be positioned at an elevation below an outlet of the passage.

According to another aspect of the invention, a condensate trap is provided to collect condensate from flue gas generated by a condensing fuel-fired appliance. The trap body of the condensate trap can define at least one guide surface positioned to guide movement of a float along a path extending between seat surfaces defined by a flue gas outlet port and a condensation outlet port of the trap body. The path can extend generally along a vertical axis. The seat surfaces defined by the flue gas outlet port and the condensation outlet port of the trap body can be oriented generally along the vertical axis, and the seat surfaces defined by the flue gas outlet port and the condensate outlet port can be oriented in planes that traverse the vertical axis.

The float can have a first surface area shaped for contact with the seat surface defined by the flue gas outlet port and a second surface area shaped for contact with the seat surface defined by the condensate outlet port. The first surface of the float can be configured to form a substantially complete seal against the flow of flue gas when in contact with the seat surface defined by the flue gas outlet port. The second surface of the float can be configured to form a substantially complete seal against the flow of flue gas when in contact with the seat surface defined by the condensate outlet port. At least one of the first and the second surfaces of the float can be convex, and at least one of the seat surfaces defined by the flue gas outlet port and the condensate outlet port can circumscribe the vertical axis.

According to yet another aspect of the invention, a method is provided for configuring a condensing fuel-fired appliance to shut down a fuel burner in response to a sensed condition. The method includes positioning a float for movement within an interior region of a trap body, in response to condensate collected in the interior region of the trap body, to a first position contacting a seat surface defined by a flue gas outlet port to substantially block the discharge of flue gas from the interior region through the flue gas outlet port and to a second position contacting a seat surface defined by a condensate outlet port to substantially block the discharge of flue gas from the interior region through the condensate outlet port when there is little or no condensate in the interior region of the trap body.

The positioning step can include substantially limiting movement of the float to movement along a vertical axis extending between the seat surface defined by the flue gas outlet port and the seat surface defined by the condensate outlet port. The positioning step can also include orienting a first surface of the float for contact with the seat surface defined by the flue gas outlet port and orienting a second surface of the float for contact with the seat surface defined by the condensate outlet port.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity.

Included in the drawings are the following figures.

DETAILED DESCRIPTION OF THE INVENTION

Figure 1:
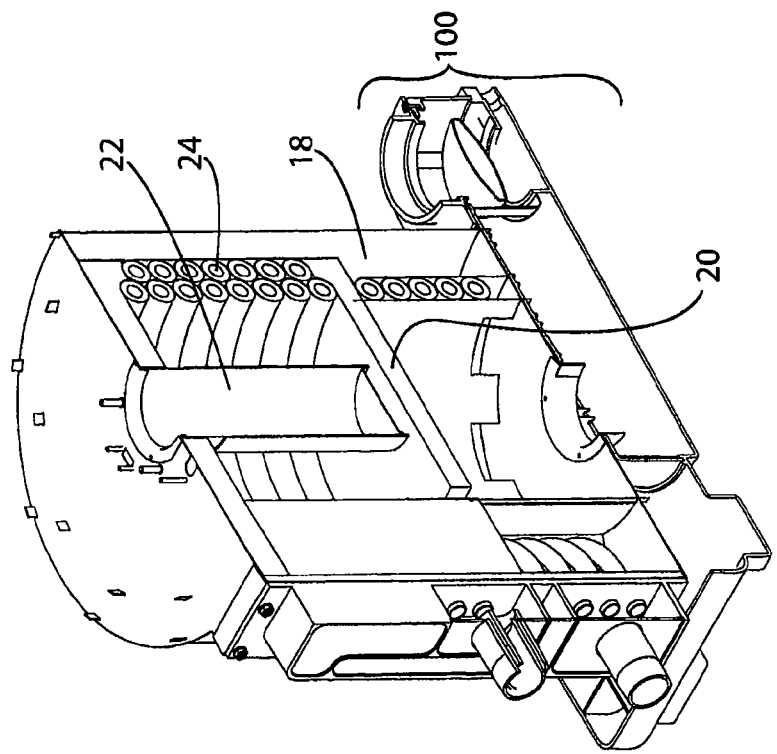
FIG. 1 is a perspective view of a first exemplary embodiment of a boiler.

Although the invention is illustrated and described herein with reference to specific embodiments, the invention is not intended to be limited to the details shown. Rather, various modifications may be made in the details within the scope and range of equivalents of the claims and without departing from the invention.

Referring generally to the figures, a condensing fuel-fired appliance 10 is provided having a fuel burner configured to generate flue gas according to one aspect of the invention. The condensing fuel-fired appliance 10 is configured to shut down the fuel burner in response to a sensed condition such as excessive flue gas pressure. The condensing fuel-fired appliance also has a condensate trap 100 positioned to collect condensate from the flue gas.

The condensate trap 100 includes a trap body 102 substantially enclosing an interior region 104. A float 112 is positioned for movement within the interior region 104 of the trap body 102. A flue gas inlet port 106 is defined by the trap body 102 for the introduction of flue gas into the interior region 104 of the trap body 102. A condensate outlet port 110 is defined by the trap body 102 for the discharge of condensate from the interior region 104, the condensate outlet port 110 defining a seat surface 116 for contact with the float 112. A flue gas outlet port 108 is defined by the trap body 102 for the discharge of flue gas from the interior region 104 of the trap body 102, the flue gas outlet port 108 defining a seat surface 114 for contact with the float 112.

The float 112 is configured to move in response to condensate 122 collected in the interior region 104 of the trap body 102 to a position contacting the seat surface 114 defined by the flue gas outlet port 108 and to substantially block the discharge of flue gas from the interior region 104 through the flue gas outlet port 108. The float 112 is also configured to move to a position contacting the seat surface 116 defined by the condensate outlet port 110 and to substantially block the discharge of flue gas from the interior region 104 through the condensate outlet port 110 when there is little or no condensate in the interior region 104 of the trap body 102.

The condensing fuel-fired appliance can include a condensate drain coupled to the condensate outlet port 110 defined by the trap body 102 of the condensate trap 100. It can also include a switch configured to shut down the fuel burner in response to a sensed condition, wherein the switch can be a pressure switch configured to shut down the fuel-fired appliance 10 in response to an increase in a pressure of the flue gas when the float 112 blocks the flue gas outlet port 108.

For example, a pressure sensor is optionally positioned to sense pressure of the flue gas. Although any such pressure sensor can be selected, the preferred type of pressure sensor is a simple diaphragm-type pressure switch that has normally closed contacts that open upon a rise in flue gas pressure. Suitable pressure switches are readily available, and one example is an air pressure switch available from Endura Plastics, Inc., of Kirtland, Ohio.

The condensing fuel-fired appliance 10 can also include a passage through which the flue gas flows, wherein the flue gas inlet port 106 defined by the condensate trap 100 is positioned to receive flue gas from the passage. The passage can be positioned to transfer heat from the flue gas to water contained in heat exchange conduits 24, and the condensate trap 100 can be positioned at an elevation below an outlet of the passage.

According to another aspect of the invention, the condensate trap 100 is provided to collect condensate from flue gas generated by the condensing fuel-fired appliance 10. The trap body 102 of the condensate trap 100 can define at least one guide surface 120 positioned to guide movement of the float 112 along a path extending between the seat surfaces 114, 116 defined by the flue gas outlet port 108 and the condensation outlet port 110 of the trap body 102. The path can extend generally along a vertical axis. The seat surfaces 114, 116 defined by the flue gas outlet port 108 and the condensation outlet port 110 of the trap body 102 can be oriented generally along the vertical axis, and the seat surfaces 114, 116 defined by the flue gas outlet port 108 and the condensation outlet port 110 can be oriented in planes that traverse the vertical axis.

The float 112 can have a first surface area 112A shaped for contact with the seat surface 114 defined by the flue gas outlet port 108 and a second surface area 112B shaped for contact with the seat surface 116 defined by the condensate outlet port 110. The first surface 112A of the float 112 can be configured to form a substantially complete seal against the flow of flue gas when in contact with the seat surface 114 defined by the flue gas outlet port 108. The second surface 112B of the float 112 can be configured to form a substantially complete seal against the flow of flue gas when in contact with the seat surface 116 defined by the condensate outlet port 110. At least one of the first and the second surfaces 112A, 112B of the float 112 can be convex, and at least one of the seat surfaces 114, 116 defined by the flue gas outlet port 108 and the condensate outlet port 110 can circumscribe the vertical axis.

According to yet another aspect of the invention, a method is provided for configuring a condensing fuel-fired appliance 10 to shut down a fuel burner in response to a sensed condition. The method includes positioning the float 112 for movement within the interior region 104 of the trap body 102, in response to condensate 122 collected in the interior region 104 of the trap body 102, to a first position contacting the seat surface 114 defined by the flue gas outlet port 108 to substantially block the discharge of flue gas from the interior region 104 through the flue gas outlet port 108 and to a second position contacting the seat surface 116 defined by the condensate outlet port 110 to substantially block the discharge of flue gas from the interior region 104 through the condensate outlet port 110 when there is little or no condensate in the interior region 104 of the trap body 102.

The positioning step can include substantially limiting movement of the float 112 to movement along the vertical axis extending between the seat surface 114 defined by the flue gas outlet port 108 and the seat surface 116 defined by the condensate outlet port 110. The positioning step can also include orienting the first surface 112A of the float 112 for contact with the seat surface 114 defined by the flue gas outlet port 108 and orienting the second surface 112B of the float 112 for contact with the seat surface 116 defined by the condensate outlet port 110.

Referring now to FIG. 1 in particular, the condensing fuel-fired appliance 10 generally includes an outer housing 12 and a mounting portion for accommodating the connection of a fuel burner 14 at a top portion of the housing 12. The condensing fuel-fired appliance 10 also includes a series of ports 16 for the inlet and outlet of water from the appliance 10. Manifolds are typically positioned in order to direct the flow of water as it enters and exits through ports 16.

Figure 2:
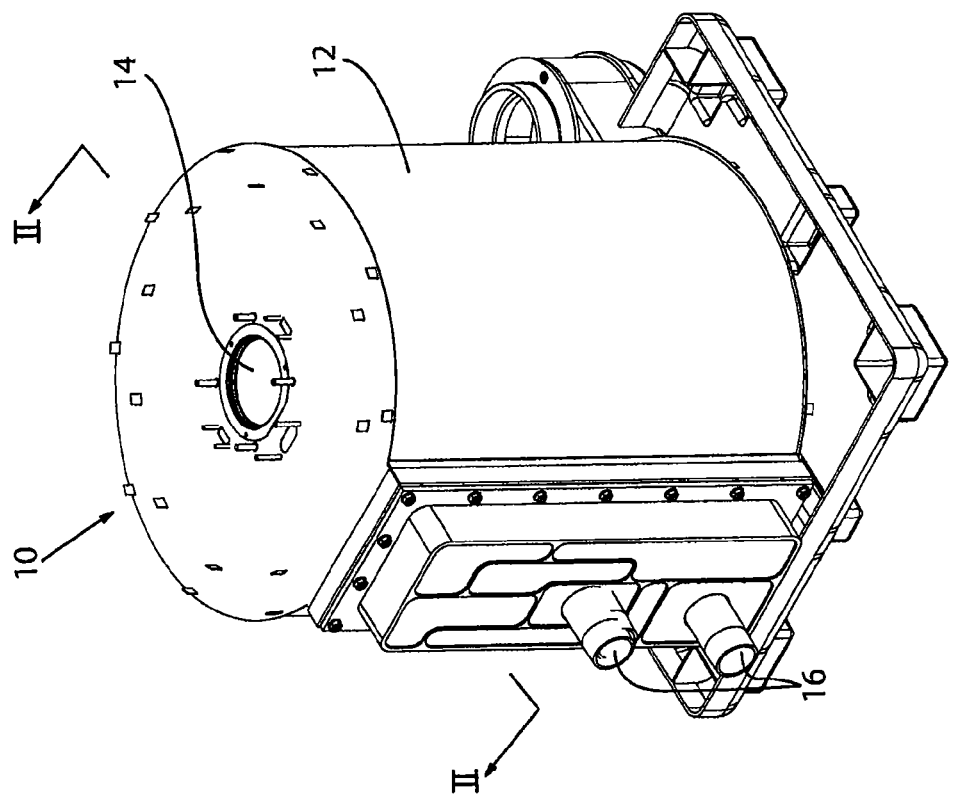
FIG. 2 is a perspective cross-sectional view of the boiler of FIG. 1 taken along the lines 2-2 in FIG. 1.

Referring to FIG. 2, the housing 12 at least partially encloses an enclosed region 18. A divider 20 is positioned to divide the enclosed region 18 at least partially into an upper region and a lower region. A burner extends downwardly from the top of the housing 12 into a burner structure 22 and terminates at a location at an elevation above divider 20 in an upper region of the enclosed region 18. Heat exchange conduits 24 are provided to contain and direct the flow of water as it passes from the inlet port of ports 16, through the condensing fuel-fired appliance 10, and then outwardly through an outlet port of ports 16.

As will be well understood by those of skill in the art, combustion gases from burner structure 22 will flow through the enclosed region 18 of the housing 12 of the condensing fuel-fired appliance 10. Both combustion gases or flue gases will flow past heat exchange conduits 24, thereby exchanging heat from the combustion gases to water contained within the heat exchange conduits 24. The combustion gases will generally flow from the burner 22 in the upper region of the enclosed region 18 above the divider 20, past the heat exchange conduits 24 oriented in columns, enter the lower region of enclosed region 18 and then exit the system at a lower portion of the housing 12. A series of baffles such as baffle 26 (shown for example in FIG. 3) is provided to direct the flow of combustion gases as it flows through the enclosed region 18 and adjacent to heat exchange conduits 24.

As a result of the cooling of combustion gases and the efficiency of heat transfer, condensation will tend to form within the condensing fuel-fired appliance 10. Accordingly, a condensate trap 100 is provided in order to manage the flow of condensate from the combustion gases so that it can be removed from the appliance 10. Details of the condensate trap 100 will be provided throughout the rest of this detailed description.

Figure 3:
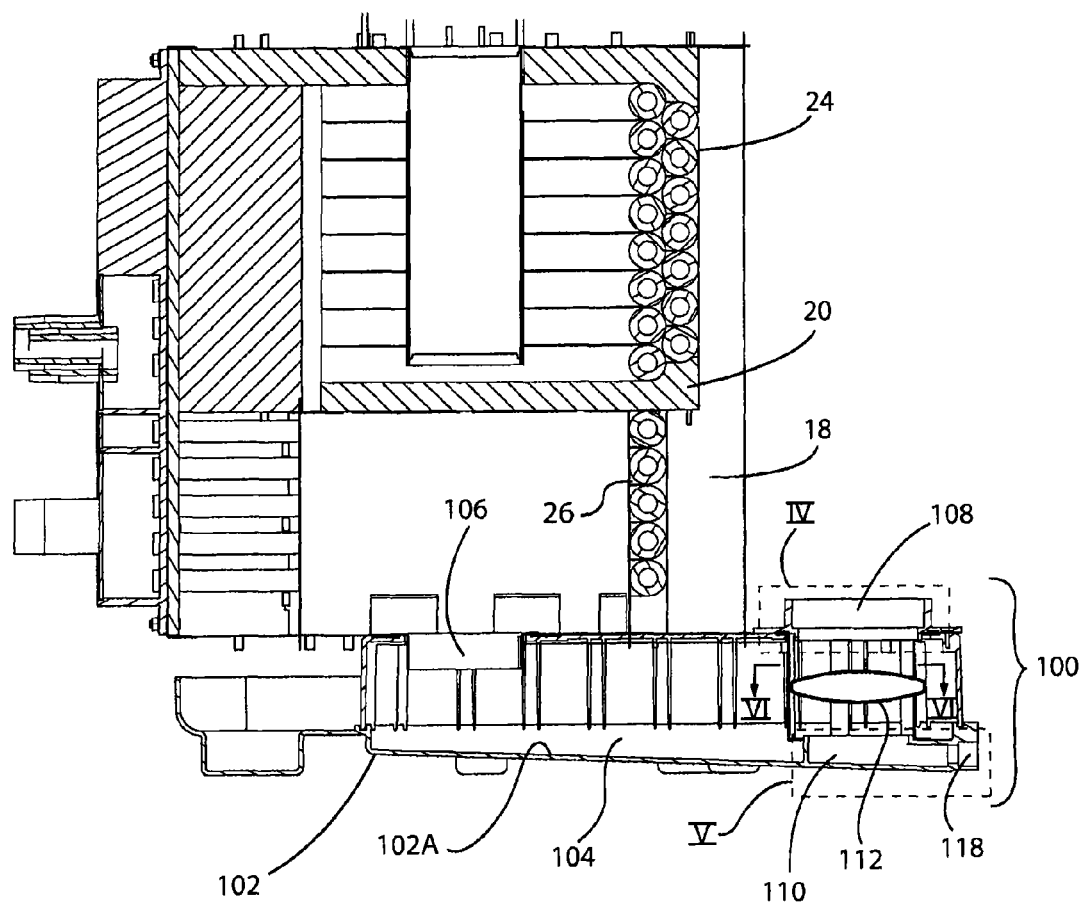
FIG. 3 is a cross-sectional side view of the boiler of FIG. 2.

Referring now to FIG. 3, condensate trap 100 includes a trap body 102 at least partially enclosing an interior region 104. The trap body 102 has a sloped lower surface 102A, which is oriented to direct the flow or passage of condensate along a lower surface of the trap body 102. In FIG. 3, the sloped lower surface 102A cooperates with gravity to urge the condensate to move from the left toward the right in that figure.

Condensate trap 100 includes a flue gas inlet port 106 defined by the trap body 102. The flue gas inlet port 106 is positioned to receive combustion gases from the enclosed region 18 of the housing 12 of the condensing fuel-fired appliance 10.

Figure 4:
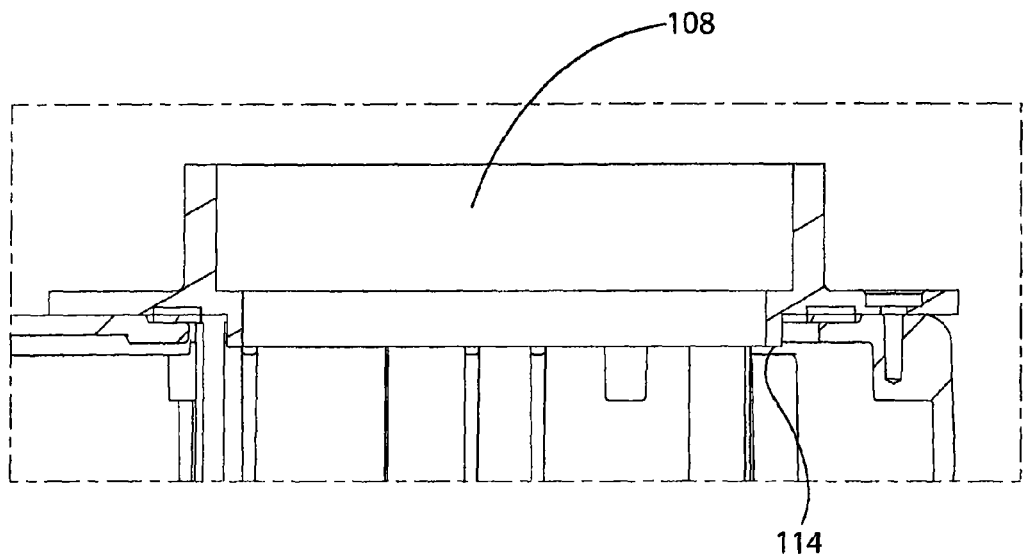
FIG. 4 is an enlarged view of an exemplary embodiment of a flue gas outlet port of the boiler of FIG. 3.

Condensate trap 100 also includes a flue gas outlet port 108 defined in the trap body 102. The flue gas outlet port 108 is oriented to permit the flow of combustion gases from the interior region 104 of trap body 102. Details of flue gas outlet port 108 are illustrated in FIG. 4.

Figure 5:
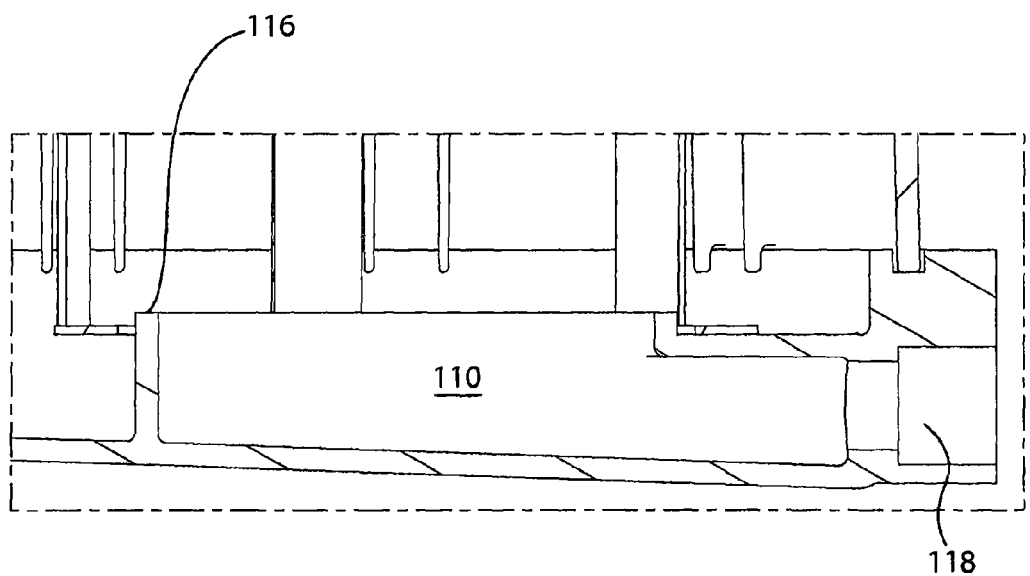
FIG. 5 is an enlarged view of an exemplary embodiment of a condensate outlet port of the boiler of FIG. 3.

Condensate trap 100 also includes a condensate outlet port 110, which is positioned to allow the flow of condensate from the interior region 104 of the trap body 102. The details of the condensate outlet port 110 are illustrated in FIG. 5.

Figure 6:
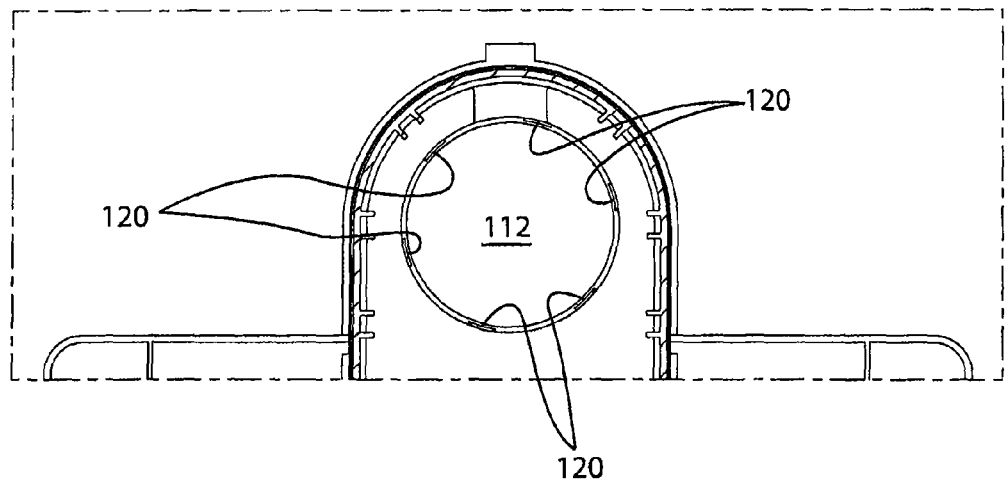
FIG. 6 is a cross-sectional top view of the boiler of FIG. 1 taken along the lines 6-6 in FIG. 3.

Condensate trap 100 also includes a float 112, which is mounted for movement at a location between the flue gas outlet port 108 and the condensate outlet port 110. As will be described later in greater detail, float 112 is configured to at least partially or fully block the flue gas outlet port 108 when a high level of condensate is contained within the interior region 104 of the trap body 102. When the interior region 104 of trap body 102 is at least partially or completely empty of condensate, then the float 112 will be positionable to fully or partially block the condensate outlet port 110, thereby inhibiting or preventing the flow of combustion gases through the condensate outlet port 110. The position of the float 112 within the interior region 104 of the condensate trap 100 is illustrated in FIG. 6, as will be described later.

The condensate trap 100 can be formed from a variety of materials and by a variety of forming methods. For example, the materials of the condensate trap 100 are either plastic materials or some other metallic or non-metallic materials. Preferably, the selected material or materials are compatible with the aggressive effects of flue gas condensate and are thermally and physically stable at flue gas temperatures.

The preferred method of manufacture of the components of condensate trap 100 is by injection molding. Other manufacturing methods can be selected for producing the desirable shape and properties depending on the materials selected, cost considerations, and other factors.

Referring now to FIG. 4, an enlarged view of the flue gas outlet port 108 is provided. In this view, a seat surface can be seen at flue gas outlet port 108. More specifically, the flue gas outlet port 108 includes a seat surface 114, which is oriented in a substantially horizontal plane and which circumscribes a vertical axis along which the float 112 is configured to move. The seat surface 114 is a substantially horizontal surface that faces downwardly. The seat surface 114 is optionally angled or tapered or concave or convex or otherwise configured in order to cooperate with a surface of the float 112.

FIG. 5 provides an expanded view of the condensate outlet port 110. It includes a seat surface 116 that lies in a substantially horizontal plane and faces upwardly in order to contact a lower surface of the float 112. Condensate outlet port 110 also includes an outlet opening 118 that is configured to be coupled to a drain line through which condensate can be removed from the condensing fuel-fired appliance 10.

Referring now to FIG. 6, the position of the float 112 is determined by surfaces of the condensate trap 100 and its trap body 102. Specifically, float 112 is substantially constrained against horizontal movement by a ring of guides having guide surfaces 120. Accordingly, guide surfaces 120 constrain the movement of float 112 so that it has limited movement in a horizontal direction yet they permit the vertical upward or downward movement of the float 112 in directions toward flue gas outlet port 108 or condensate outlet port 110. More specifically, the float 112 reacts to the force of gravity as well as to the force of buoyancy when it is in contact with condensate in the interior region 104 of the trap body 102. There may be any number of guides. Although six are shown for illustration, there may be more or fewer. At least three are preferred.

Figure 7:
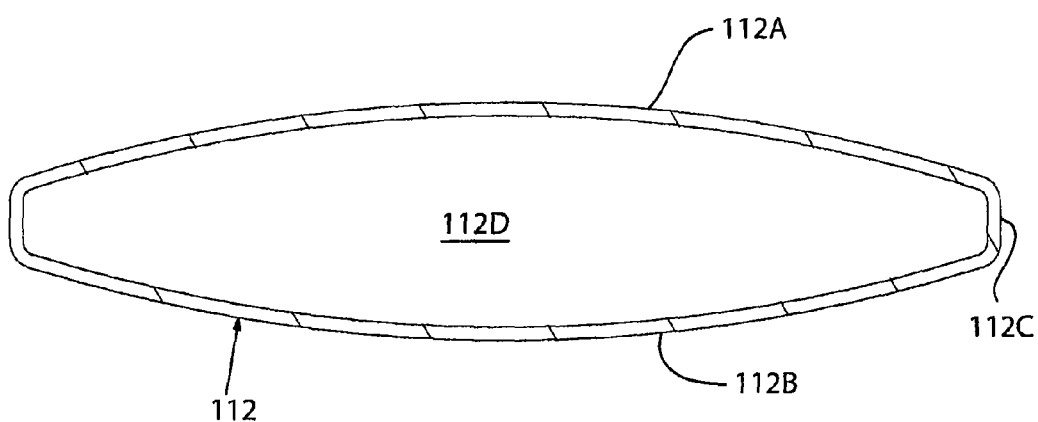
FIG. 7 is a cross-sectional side view of an exemplary embodiment of a float that can be used in the boiler of FIG. 1.

Referring now to FIG. 7, details of an exemplary embodiment of a float 112 are described. Float 112 includes a convex first surface area 112A on a top side of the float 112. It also includes a convex second side area 112B on a lower side of the float 112. A perimeter surface 112C extends between the convex first surface area 112A and the convex second surface area 112B. The float 112 has a hollow interior 112D that may optionally be filled with a material having a density selected to adjust the height at which the float 112 floats on collected condensation.

The surfaces 112A, 112B, and 112C of float 112 provide various functions. First surface area 112A provides a sealing surface configured for contact with the seat surface 114 of flue gas outlet port 108, thereby substantially sealing against the flow of combustion gases through the flue gas outlet port 108 when the float 112 contacts the seat surface 114. Similarly, convex second surface area 112B provides a sealing surface when contacting a seat surface 116 of the condensate outlet port 110, such as when there is little or no condensate in the condensate trap 100. In that position, second surface area 112B substantially prevents or at least inhibits the flow of combustion gases from the interior region 104 of the trap body 102 and outwardly through the condensate outlet port 110. Additionally, the perimeter surface 112C contacts the guide surface or surfaces 120 of the trap body 102, thereby substantially centering the float 112 horizontally for movement along a vertical axis.

Figure 8A:
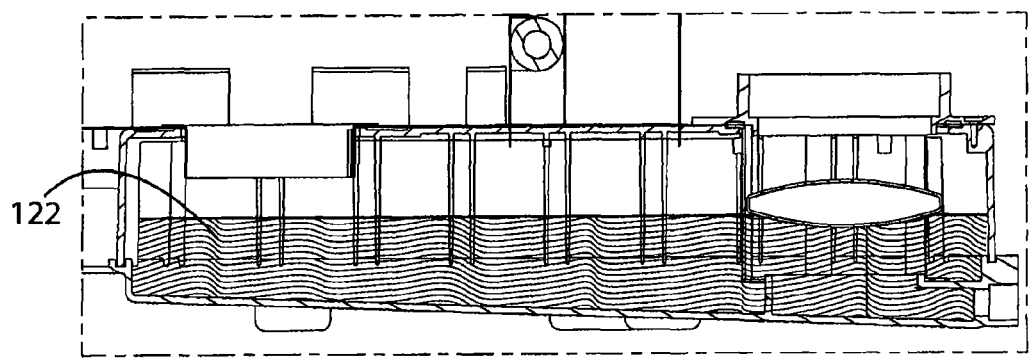
FIGS. 8A-8C are cross-sectional side elevation views of an embodiment of a condensate trap showing a float in different positions.
Figure 8B:
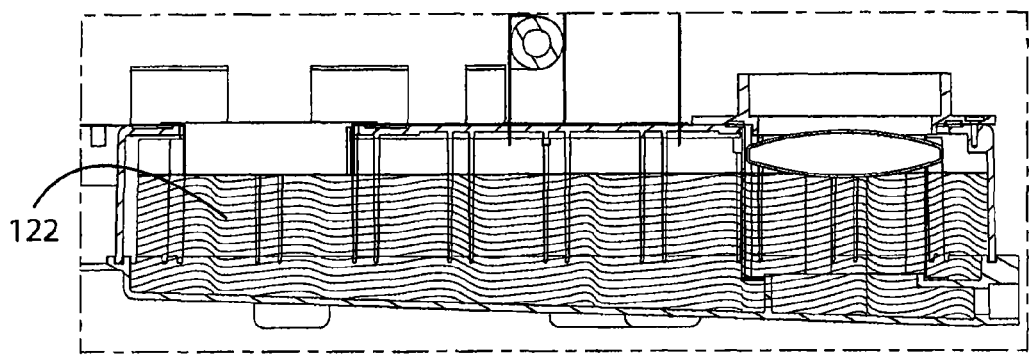
Figure 8C:
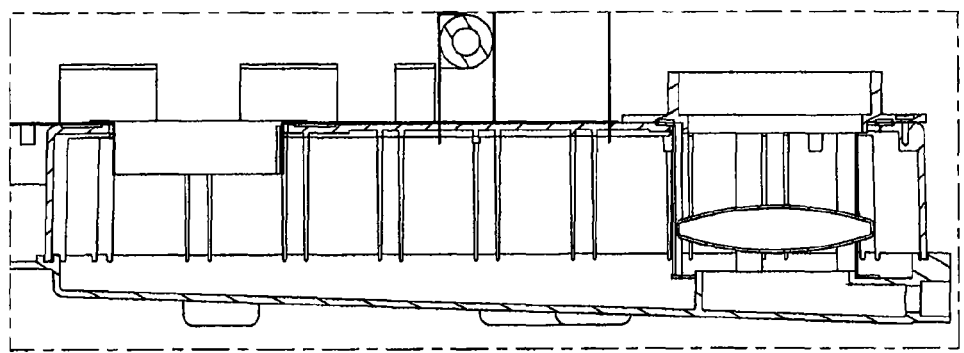

Referring now to FIGS. 8A-8C, the general operation of the condensate trap 100 will now be described according to exemplary aspects of the invention. As will be generally understood from the foregoing description, the float 112 is free to move upwardly or downwardly depending upon the level of condensate within the condensate trap 100. More specifically, it will be able to travel between three general positions; namely, an upper-most position in which the first surface area 112A of the float 112 contacts the seat surface 114 of the flue gas outlet port 108, a lower-most position in which the second surface area 112B of the float 112 contacts the seat surface 116 of the condensate outlet port 110, and a third position anywhere between the first and second positions.

Referring to FIG. 8A specifically, this position may be considered a normal operating position in which there is sufficient condensate 122 in the condensate trap 100 to elevate the float 112 above the seat surface 116 of the condensate outlet port 110. In this position, combustion gases are substantially free to flow from the flue gas inlet port 106, through the interior region 104, and outwardly through the flue gas outlet port 108. The combustion gases are blocked from exiting the condensate outlet port 110 because of the level of the condensate 122, which essentially blocks the gas flow.

In FIG. 8B, the float 112 substantially seals against the flow of flue gases from the flue gas outlet port 108. In that position, combustion gases entering through the flue gas inlet port 106 cannot readily escape the condensate trap 100 because the flue gas outlet port 108 is at least partially blocked and so is the condensate outlet port 110. When this occurs, there will be an increase in pressure in the combustion gases. When that pressure reaches a predetermined pressure as sensed by a pressure sensor, the burner of the condensing fuel-fired appliance 110 can be shut down.

In FIG. 8C, there is little or no condensate in the interior region 104 of the condensate trap 100. The float 112 is therefore biased by gravity against the condensate outlet port 110 such that the second surface area 112B of the float 112 creates a partial or full seal against the seat surface 116 of the condensate outlet port 110. In this position, combustion gases are permitted to escape the condensate trap through the flue gas outlet port 108 but are substantially prevented from escaping through the condensate outlet port 110.

Generally referring to FIGS. 8A-8C, it will be noted that the condensate trap 100 has a trap body 102 that orients the inlet and outlet ports so as to provide the float with several functions. Specifically, the flue gas outlet port 108 and condensate outlet port 110 are aligned along the vertical axis that extends through an interior region 104 of the trap body 102. Also the flue gas inlet port 106 opens to the interior region at 104. This orientation of the inlet and outlet ports permits the float 112 to block against the inadvertent exhaust of combustion gases through the condensate outlet port 110 when the condensate trap is empty. It also prevents the flow of flue gas through the flue gas outlet port 108 when the condensate trap is over-filled.

According to exemplary embodiments of this invention, the float 112 is configured to protect against the escape of flue products from the condensate drain or outlet. Ideally, the float 112 in the condensate trap 100 inhibits, reduces, prevents, or even completely stops the escape of flue products into the condensate outlet port 110 when there is little or no condensate contained within the condensate trap 100. Accordingly, the float 112 is configured to perform the dual functions of (1) inhibiting flue gas flow from exiting the condensate outlet port 110 when the condensate trap 100 is substantially empty while (2) also inhibiting the flow of flue gas through the flue gas outlet port 108 when the condensate trap 100 is substantially filled with condensate.

It will also be appreciated that the orientations of the float 112 and outlets 108, 110 of the condensate trap 100 are preferably selected such that a single component, such as float 112, can perform the dual functions described previously. For example, and as illustrated in FIG. 3, the flue gas outlet port 108 is optionally positioned at an elevation directly above the condensate outlet port 110 such that the float 112 can move along a substantially vertical axis between the ports 108, 110. Also, the orientations of the ports 108, 110 are preferably selected such that those ports occupy substantially horizontal planes. In such an orientation, the seats 114, 116 of the respective ports 108, 110 also occupy substantially horizontal planes.

It is contemplated, however, that one or more of the ports 108, 110 may occupy a plane that is oriented at an angle to a horizontal plane. For example, one or both of ports 108, 110 can be positioned at any angle with respect to a horizontal plane. Preferably, such an angle is 45 degrees or less. More preferably, the angle is 30 degrees or less. Most preferably, the angle is 15 degrees or less. In the exemplary embodiment illustrated in FIGS. 3-5, the outlet ports 108, 110 and their respective seats 114-116 are oriented in substantially horizontal planes that are at an angle of 0 degrees or near 0 degrees.

As described previously, the float 112 of the condensate trap 100 optionally floats freely along a vertical axis, constrained by the surfaces 120 of guides positioned within the condensate trap 100. As illustrated in FIGS. 3-5 and 8A-8C, the vertical axis along which the float 112 travels is exactly or substantially perpendicular to the horizontal planes within which the seats 114, 116 of the respective ports 108, 110 are oriented. Also, the vertical axis along which the float 112 moves is aligned with the center of the circular regions circumscribed by the seats 114, 116. In other words, the vertical axis is centered with respect to the seats 114, 116.

Although the float 112 illustrated in the figures moves along the vertical axis, it is contemplated that the float may travel along a non-linear path such as an arcuate path. For example, a float is optionally coupled to an arm extending from a pivot such that pivoting movement of the arm guides the float 112 along an arcuate path between the port 108 and port 110. In such a configuration, it may be preferred to orient one or both of the ports 108, 110 and/or their respective seats 114, 116 at an angle with respect to a horizontal plane. By so doing, the seats 114, 116 can be oriented to contact surfaces of the float 112 after the float 112 has moved along its arcuate path. Also, in such an orientation, the ports 108, 110 may or may not be vertically aligned with respect to one another. While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A condensing fuel-fired appliance having a fuel burner configured to generate flue gas, the condensing fuel-fired appliance being configured to shut down the fuel burner in response to a sensed condition, the condensing fuel-fired appliance also having a condensate trap positioned to collect condensate from the flue gas, the condensate trap comprising:
   a trap body substantially enclosing an interior region;
   a float positioned for movement within the interior region of the trap body;
   a flue gas inlet port defined by the trap body for the introduction of flue gas into the interior region of the trap body;
   a condensate outlet port defined by the trap body for the discharge of condensate from the interior region, the condensate outlet port defining a seat surface for contact with the float;
   a flue gas outlet port defined by the trap body for the discharge of flue gas from the interior region of the trap body, the flue gas outlet port defining a seat surface for contact with the float;
   wherein the float is configured to move in response to condensate collected in the interior region of the trap body to a position contacting the seat surface defined by the flue gas outlet port and to substantially block the discharge of flue gas from the interior region through the flue gas outlet port; and
   wherein the float is configured to move to a position contacting the seat surface defined by the condensate outlet port and to substantially block the discharge of flue gas from the interior region through the condensate outlet port when there is little or no condensate in the interior region of the trap body.

2. The condensing fuel-fired appliance of claim 1, further comprising a condensate drain coupled to the condensate outlet port defined by the trap body of the condensate trap.

3. The condensing fuel-fired appliance of claim 1, further comprising a switch configured to shut down the fuel burner in response to a sensed condition.

4. The condensing fuel-fired appliance of claim 3, the switch being a pressure switch configured to shut down the fuel-fired appliance in response to an increase in a pressure of the flue gas when the float blocks the flue gas outlet port.

5. The condensing fuel-fired appliance of claim 1, further comprising a passage through which the flue gas flows, wherein the flue gas inlet port defined by the condensate trap is positioned to receive flue gas from the passage.

6. The condensing fuel-fired appliance of claim 5, wherein the passage is positioned to transfer heat from the flue gas to water contained in heat exchange conduits.

7. The condensing fuel-fired appliance of claim 5, wherein the condensate trap is positioned at an elevation below an outlet of the passage.

8. A condensate trap configured to collect condensate from flue gas generated by a condensing fuel-fired appliance, the condensate trap comprising:
   a trap body substantially enclosing an interior region;
   a float positioned for movement within the interior region of the trap body;
   a flue gas inlet port defined by the trap body for the introduction of flue gas into the interior region of the trap body;
   a condensate outlet port defined by the trap body for the discharge of condensate from the interior region, the condensate outlet port defining a seat surface for contact with the float;
   a flue gas outlet port defined by the trap body for the discharge of flue gas from the interior region of the trap body, the flue gas outlet port defining a seat surface for contact with the float;
   wherein the float is configured to move in response to condensate collected in the interior region of the trap body to a position contacting the seat surface defined by the flue gas outlet port and to substantially block the discharge of flue gas from the interior region through the flue gas outlet port; and
   wherein the float is configured to move to a position contacting the seat surface defined by the condensate outlet port and to substantially block the discharge of flue gas from the interior region through the condensate outlet port when there is little or no condensate in the interior region of the trap body.

9. The condensate trap of claim 8, the trap body of the condensate trap further defining at least one guide surface positioned to guide movement of the float along a path extending between the seat surfaces defined by the flue gas outlet port and the condensation outlet port of the trap body.

10. The condensate trap of claim 9, wherein the path extends generally along a vertical axis.

11. The condensate trap of claim 10, wherein the seat surfaces defined by the flue gas outlet port and the condensation outlet port of the trap body are oriented generally along the vertical axis.

12. The condensate trap of claim 10, wherein the seat surfaces defined by the flue gas outlet port and the condensate outlet port are oriented in planes that traverse the vertical axis.

13. The condensate trap of claim 10, at least one of the seat surfaces defined by the flue gas outlet port and the condensate outlet port circumscribes the vertical axis.

14. The condensate trap of claim 8, the float having a first surface area shaped for contact with the seat surface defined by the flue gas outlet port and a second surface area shaped for contact with the seat surface defined by the condensate outlet port.

15. The condensate trap of claim 14, the first surface of the float being configured to form a substantially complete seal against the flow of flue gas when in contact with the seat surface defined by the flue gas outlet port.

16. The condensate trap of claim 14, the second surface of the float being configured to form a substantially complete seal against the flow of flue gas when in contact with the seat surface defined by the condensate outlet port.

17. The condensate trap of claim 14, at least one of the first and the second surfaces of the float being convex.

18. A method for configuring a condensing fuel-fired appliance to shut down a fuel burner in response to a sensed condition, the method comprising:
   positioning a float for movement within an interior region of a trap body, in response to condensate collected in the interior region of the trap body, to a first position contacting a seat surface defined by a flue gas outlet port to substantially block the discharge of flue gas from the interior region through the flue gas outlet port and to a second position contacting a seat surface defined by a condensate outlet port to substantially block the discharge of flue gas from the interior region through the condensate outlet port when there is little or no condensate in the interior region of the trap body.

19. The method of claim 18, the positioning step comprising substantially limiting movement of the float to movement along a vertical axis extending between the seat surface defined by the flue gas outlet port and the seat surface defined by the condensate outlet port.

20. The method of claim 18, the positioning step comprising orienting a first surface of the float for contact with the seat surface defined by the flue gas outlet port and orienting a second surface of the float for contact with the seat surface defined by the condensate outlet port.

* * * * *